United States Patent
Bennett et al.

(10) Patent No.: US 9,535,995 B2
(45) Date of Patent: Jan. 3, 2017

(54) OPTIMIZING A RANKER FOR A RISK-ORIENTED OBJECTIVE

(75) Inventors: Paul N. Bennett, Seattle, WA (US); Kevyn B. Collins-Thompson, Seattle, WA (US); Lidan Wang, Greenbelt, MD (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/323,845

(22) Filed: Dec. 13, 2011

(65) Prior Publication Data

US 2013/0151495 A1 Jun. 13, 2013

(51) Int. Cl.
*G06F 17/30* (2006.01)

(52) U.S. Cl.
CPC ............................ *G06F 17/30864* (2013.01)

(58) Field of Classification Search
CPC ................ G06F 17/3053; G06F 17/30864
USPC ................................ 707/706, 731, 748, 705
See application file for complete search history.

(56) References Cited

U.S. PATENT DOCUMENTS

| | | | |
|---|---|---|---|
| 6,728,701 B1 * | 4/2004 | Stoica | 707/748 |
| 7,383,262 B2 | 6/2008 | Das et al. | |
| 7,593,934 B2 * | 9/2009 | Li | G06F 17/30864 |
| 7,693,827 B2 * | 4/2010 | Zamir et al. | 707/999.003 |
| 7,809,665 B2 * | 10/2010 | Acharya | 706/47 |
| 7,853,599 B2 * | 12/2010 | Liu | G06F 17/30675 |
| | | | 707/748 |
| 7,895,198 B2 * | 2/2011 | Chapelle | 707/728 |
| 7,984,039 B2 * | 7/2011 | Carmel et al. | 707/713 |
| 8,027,985 B2 * | 9/2011 | Dettinger et al. | 707/752 |
| 8,108,374 B2 * | 1/2012 | Zhang | G06F 17/30864 |
| | | | 707/705 |
| 8,140,518 B2 * | 3/2012 | Dasdan | G06F 17/30864 |
| | | | 707/713 |
| 8,538,896 B2 * | 9/2013 | Mensink | G06F 17/30722 |
| | | | 706/12 |
| 8,577,873 B2 * | 11/2013 | Bandyopadhyay et al. | 707/722 |
| 2003/0110147 A1 * | 6/2003 | Li et al. | 706/1 |
| 2004/0153440 A1 * | 8/2004 | Halevy et al. | 707/3 |
| 2008/0027913 A1 * | 1/2008 | Chang et al. | 707/3 |
| 2009/0228472 A1 * | 9/2009 | Taylor | G06F 17/30306 |
| 2009/0248667 A1 * | 10/2009 | Zheng | G06F 17/30864 |
| 2010/0250523 A1 * | 9/2010 | Jin et al. | 707/723 |
| 2010/0293175 A1 * | 11/2010 | Vadrevu | G06F 17/30864 |
| | | | 707/759 |

(Continued)

OTHER PUBLICATIONS

Collins-Thompson, Kevyn B., "Robust Model Estimation Methods for Information Retrieval", Retrieved at <<http://www.lti.cs.cmu.edu/Research/Thesis/KevynCollins-Thompson%20Thesis.pdf>>, LTI Technical Report CMU, Dec. 4, 2008, pp. 1-244.

(Continued)

*Primary Examiner* — Miranda Le
(74) *Attorney, Agent, or Firm* — Sandy Swain; Micky Minhas (57) ABSTRACT

Technologies are described herein that pertain to optimizing a ranker component for a risk-oriented objective. Various definitions of risk are described herein, wherein risk is based upon variance in performance scores assigned to the ranker component for respective queries in a data store. Additionally, risk is optionally based upon variance in relative performance of the ranker component versus a baseline ranker component.

20 Claims, 7 Drawing Sheets

(56) References Cited

U.S. PATENT DOCUMENTS

| | | | | |
|---|---|---|---|---|
| 2011/0093331 | A1* | 4/2011 | Metzler et al. | 705/14.49 |
| 2011/0145175 | A1* | 6/2011 | Agarwal | 706/12 |
| 2011/0184941 | A1* | 7/2011 | El-Charif | G06F 17/30864 707/723 |
| 2011/0235901 | A1* | 9/2011 | Hu | 382/159 |
| 2011/0246285 | A1* | 10/2011 | Ratnaparkhi et al. | 705/14.42 |
| 2011/0246409 | A1* | 10/2011 | Mitra | 706/52 |
| 2011/0270845 | A1* | 11/2011 | Lin et al. | 707/748 |

OTHER PUBLICATIONS

Chapelle, et al., "Intent-Based Diversification of Web Search Results: Metrics and Algorithms", Retrieved at <<http://people.ee.duke.edu/~shji/papers/err_ia.pdf>>, Springer Science+Business Media (LLC), Information Retrieval, May 20, 2011, pp. 1-21.

Jain, et al., "Learning to Re-Rank: Query-Dependent Image Re-Ranking Using Click Data", Retrieved at <<http://research.microsoft.com/en-us/um/people/manik/pubs/jain11.pdf>>, Proceedings of the 20th International Conference on World Wide Web (WWW), Mar. 28, 2011, pp. 277-286.

Wang, Jun, "Mean-Variance Analysis: A New Document Ranking Theory in Information Retrieval", Retrieved at <<http://ict.ewi.tudelft.nl/pub/jun/portfolio-theory-ecir09.pdf>>, Proceedings of the 31th European Conference on IR Research on Advances in Information Retrieval (ECIR), Apr. 6-9, 2009, pp. 1-12.

Collins-Thompson, Kevyn, "Enriching Information Retrieval with Reading Level Prediction", Retrieved at <<http://select.cs.cmu.edu/meetings/enir2011/papers/collins-thompson.pdf>>, SIGIR Workshop on Enriching Information Retrieval (ENIR), Jul. 28, 2011, pp. 1-3.

Moon, et al., "Refining Recency Search Results with User Click Feedback", Retrieved at <<http://arxiv.org/PS_cache/arxiv/pdf/1103/1103.3735v1.pdf>>, CoRR, Mar. 19, 2011, pp. 1-22.

Dai, et al., "Learning to Rank for Freshness and Relevance", Retrieved at <<http://research.microsoft.com/pubs/150747/Dai2011.pdf>>, Proceedings of the 34th Annual ACM SIGIR Conference on Research and Development in Information Retrieval, Jul. 24-28, 2011, pp. 95-104.

* cited by examiner

OPTIMIZING A RANKER FOR A RISK-ORIENTED OBJECTIVE

BACKGROUND

Information retrieval is the area of study concerned with searching for documents, information within documents, and/or metadata about documents. Accordingly, a search engine can be referred to as an information retrieval application. A web search engine is designed to search for information on the World Wide Web and FTP servers. Search engines include rankers that are configured to receive a query and output a ranked list of search results responsive to receipt of the query. The search results may include web pages, images, information and other types of data. Additionally, a search engine may be configured to mine data that is available in network-accessible databases and/or open directories.

Generally, a ranker is trained by optimizing performance of the ranker in accordance with a performance metric, such that parameters of the ranker are determined to cause the ranker to perform as well as possible with respect to some performance metric (on average across all queries in training data). Labeled training data may be retained in a data store, such that the training data includes queries and (labeled) ranked search results that correspond to such queries. Therefore, if the ranker is operating ideally, for a given query the ranker will output search results in the order identified in the training data. Various techniques are currently available to compute the performance of a ranker for training data. Exemplary techniques for determining performance of the ranker on a per query basis include normalized discounted cumulative gain (NDCG), mean average precision (MAP), amongst others.

Accordingly, the general performance of a ranker is often determined by averaging the per query performance score. Thus, conventionally, parameter values of the ranker are learned such that the averaged per query performance score is as high as possible. Such approach, however, fails to take into consideration the perception of a user when the search engine performs very poorly for particular queries. For instance, even if a ranker is learned as described above (where parameter values are set to cause the average performance scores across queries to be maximized), if the ranker performs very poorly on certain queries, the user will perceive that the ranker generally performs poorly.

SUMMARY

The following is a brief summary of subject matter that is described in greater detail herein. This summary is not intended to be limiting as to the scope of the claims.

Described herein are various technologies pertaining to learning parameters of a ranker based at least in part upon a risk-oriented objective. A risk-oriented objective is based at least partially upon a distribution in performance values for the ranker for queries in training data, either relative to a threshold or relative to performance of another ranker. The performance values can be computed by way of normalized distributed cumulative gain (NDCG), mean average precision (MAP), or some other suitable technique for computing performance values for a ranker with respect to certain queries in training data. In an exemplary embodiment, performance values can be computed for the ranker for a plurality of queries in a training set. Instead of learning parameters of the ranker such that the average performance scores are as high as possible, the parameters of the ranker can be learned to control distribution of performance scores assigned to queries, thereby causing the resulting ranker to be robust and consistent.

In an exemplary embodiment, parameters of the ranker can be learned to take into consideration distribution in performance of the ranker across queries in training data relative to performance of a baseline ranker for the queries in the training data. Pursuant to an example, performance values for the baseline ranker can be computed for a plurality of queries in training data. Parameters of the ranker can then be learned to reduce declination in performance of the ranker relative to the baseline ranker for a subset of the queries (at the possible cost of reducing increases in performance of the ranker relative to the baseline for other queries). Accordingly, the parameters of the ranker may be learned such that the average performance value for the ranker across the queries in the training data is not maximized; however, the "downside" of the ranker is reduced.

In an exemplary embodiment, the parameters of the ranker can be learned by optimizing for a tradeoff between risk and reward, where a function includes a risk term (which takes into consideration queries where the ranker performs poorly relative to the baseline ranker) and a reward term (which takes into consideration queries where the ranker performs better than the baseline ranker). A user-definable weight can be assigned to the risk term and/or the reward term, thereby controlling the risk-averseness of the ranker. In another exemplary embodiment, the weight can be assigned at least partially in an automated fashion, on a query-by-query basis. For instance, if the result quality corresponding to a query is already known to be low, then the weight can be assigned to cause the ranker to be less risk-averse. If the weight is assigned to the risk term, the higher the value of such weight the more risk-averse the ranker. Queries can be categorized as "risk" or "reward" in any suitable manner. For instance, with respect to the ranker, queries that have performance scores below a threshold value can be categorized as risk, while queries that have performance scores above a threshold value can be categorized as reward. In another example, a threshold percentage of queries with the lowest performance scores can be categorized as risk, while a threshold percentage of queries with performance scores above a threshold can be categorized as reward. In still yet another example, a query can have a performance score corresponding thereto for both the ranker and the baseline ranker. If the score for the query for the ranker is below the score for the query for the baseline ranker by a threshold value, the query can be categorized as risk. Other mechanisms for defining risk and reward are contemplated and are intended to fall under the scope of the hereto-appended claims.

In still yet another exemplary embodiment, a plurality of rankers with parameters learned in accordance with a risk-oriented objective can be combined to generate a robust ranker. As mentioned above, a user-defined parameter can be set to control risk-averseness of ranker. The value of such parameter can be modified for different rankers, thereby creating rankers that behave differently. For instance, rankers that have been trained to be risk averse provide greater emphasis to features that give meta-information about confidence or quantity of data used to estimate other features. Accordingly, by varying a value of the parameter a range of rankers with complementary properties can be obtained and combined.

DETAILED DESCRIPTION

Various technologies pertaining to optimizing a ranker for a risk-oriented objective will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
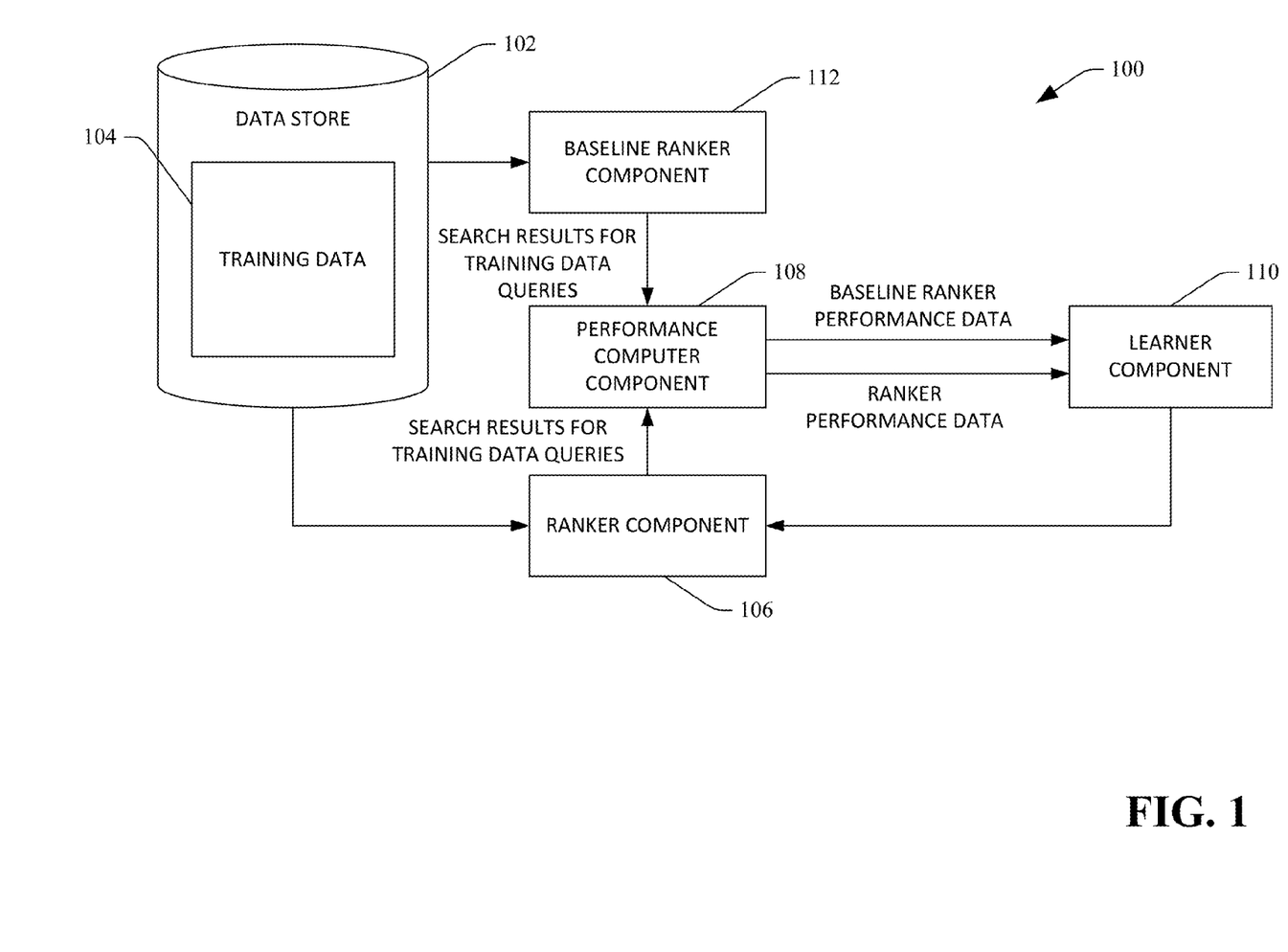
FIG. 1 is a functional block diagram of an exemplary system that facilitates learning parameters of a ranker by optimizing the ranker for a risk-based objective.

With reference now to FIG. 1, an exemplary system 100 that facilitates learning parameters of a ranker (training the ranker) to optimize the ranker for a risk-based objective is illustrated. A ranker component, as the term is used herein, refers to a computer-executable program that outputs a ranked list of search results responsive to receipt of a query (user generated or programmatically generated). In an exemplary embodiment, the ranker component may be included in a search engine that is configured to execute a search over an index responsive to receipt of a query and output search results that are ordered by computed relevance. Optimizing for a risk-based objective refers to training the ranker component such that distribution/variance in performance values for queries in training data is considered, particularly for queries upon which the ranker component performs poorly. It can be noted that this is markedly different from conventional techniques where, ranker components are optimized for highest possible average performance across all queries in training data.

The end result of optimizing the ranker component for the risk-based objective is a robust ranker component that, from the perception of an end user, avoids "catastrophic" errors in search results output therefrom. That is, a ranker component with a large variance in performance values may be perceived by users as being a poor ranker, even though such ranker component is optimized for a standard performance metric. This is because users tend to remember extremely poor outcomes. For instance, a high variance ranker component may achieve impressive results on some, queries, but failures on other queries may lead to an overall perception of poor system quality by users. Therefore, optimizing the ranker for a risk-oriented objective penalizes ranker components with significant downside (ranker components that perform very poorly on certain queries). Thus, when two separate ranker components have a same average effectiveness across queries, the ranker component with lower risk (a lower variance or distribution of performance across queries) is preferred.

The system 100 comprises a data store 102 that includes training data 104. The training data 104 includes queries and corresponding labeled search results. Thus, the training data 104 comprises a plurality of queries, and for each query in the plurality of queries, a list of search results with a known (correct) order.

The system 100 further comprises a ranker component 106 that receives queries in the training data 104 and outputs search results responsive to receipt of such queries, wherein the search results are output in an order based upon parameter values of the ranker component 106. For instance, the ranker component 106 can assign weights to certain features of documents, and can rank search results in accordance with weighted feature values. The weights can be parameters that can be learned during training. The ranker component 106 can be or include any suitable ranking model such as, but not limited to, a gradient based ranking model such as a decision tree or an ensemble of decision trees. An exemplary gradient-based ranking model is LambdaRank, which is described in Burges, at, "Learning to Rank with Non-Smooth Cost Functions", NIPS. 2006, pages 1-8. Another exemplary gradient-based ranking model is LambdaMART, which is described Burges, et al., "Learning to Rank Using Classification and Gradient Boosting", NIPS, 2007, pages 1-10. Lambda Rank and LambdaMart are also described in Burges, et al., "From RankNet to LamdaRank to LamdaMart: An Overview", Microsoft Research Technical Report MSR-TR-2010-82, 2010, Pages 1-19. The entireties of such references are incorporated herein by reference. Other ranking models are contemplated and are intended to fall under the scope of the hereto appended claims.

A performance computer component 108 receives the search results for the training data queries output by the ranker component 106 and further receives the training data 104, and outputs performance data for the ranker component 106 based upon the search results output by the ranker component 106 in comparison with the optimal ranking identified in the training data 104. The performance data for the ranker component 106 includes per query performance scores for the ranker component 106, such that the performance computer component 108 computes a score for respective each query in the training data 104. Such scores can be represented as follows: $pr_i$ for $q_i$, $i=1, \ldots k$, where $pr_i$ is a performance score for the ranker 106 for query $q_i$. Therefore, the output of the performance computer component 108 is a distribution in performance scores for queries considered by the ranker component 106. The performance computer component 108 may utilize any suitable technique for computing performance scores for the ranker component 106 for queries in the training data 104. For instance, the performance computer component 108 can compute the normalized discounted cumulative gain (NDCG) for each query $q_i$, can compute the mean average precision (MAP) for each query $q_i$, etc.

The system 100 further comprises a learner component 110 that can update at least one parameter of the ranker component 106 to optimize the ranker component 106 for a risk-oriented objective, wherein risk is a function of the distribution/variance of the performance scores $pr_i$ for the ranker component 106. In an exemplary embodiment, the learner component 110 can update the parameter of the ranker component 106 to reduce a distribution/variance of the performance scores $pr_i$. Exemplary algorithms that can be employed in connection with optimizing the ranker component 106 for a risk-oriented objective are set forth below. Generally, such function will include a risk term and a weight that is assigned to the risk term, wherein the weight is user-selectable and is used to control performance variance, particularly on queries where the ranker component 106 performs poorly. As the value of the weight increases, the risk-averseness of the model component 106 increases.

In an exemplary embodiment, the risk term will be based upon performance values for queries that indicate that the ranker component 106 performs poorly on such queries (relative to a threshold performance value or, as will be described below, relative to performance of another ranker component). In an exemplary embodiment, the risk term can be an average of performance values for queries upon which it is deemed that the ranker component 106 performs poorly. In another exemplary embodiment, the risk term can take query frequency into consideration, such that frequently issued queries are given greater weight, particularly when the ranker component 106 performs poorly on such queries. Still further, the risk term can be based upon performance scores for some threshold percentage of queries upon which the ranker component 106 performs most poorly. Specifically, what is desirably considered can be referred to as Value at Risk and Conditional Value at Risk. With respect to Value at Risk, it is desirable to avoid large amounts of mass in a distribution in performance beyond some threshold. With respect to Conditional Value at Risk, it is desirable to avoid having too low an expectation within a mass below some threshold. The goal, then, of the learner component 110 is to learn parameter values of the ranker component such that the ranker component 106 performs relatively consistently across queries. An exemplary risk oriented objective that can be employed by the learner component 110 to optimize the ranker component 106 is as follows:

$$T(\alpha) = AVGReward_{q_i:i=1,\ldots,k}(q_i) - \alpha \cdot AVGRisk_{q_i:i=1,\ldots,k}(q_i), \qquad (1)$$

where $\alpha$ is a user specified weight on the risk term, Reward $(q_i)$ computes value based upon performance scores for queries $q_i$ upon which the ranker component 106 performs well (e.g., the performance scores are in the top X percentile, the performance scores are above a predefined threshold, . . . ), Risk$(q_i)$ computes a value based upon performance scores for queries $q_i$ upon which the ranker component 106 performs poorly (e.g., the performance scores are in the bottom Y percentile, the performance scores are below a predefined threshold, . . . ), and T is a performance metric (or optimization objective) that is indicative of a tradeoff between risk and reward. It can be ascertained that Reward $(q_i)=0$ for queries upon which the ranker component 106 is deemed to perform poorly, and Risk$(q_i)=0$ for queries upon which the ranker component 106 performs well. The learner component 110 learns parameters of the ranker component 106 such that $T(\alpha)$ is optimized—typically by choosing parameters that maximize this value but in another instantiation, T may by optimized by minimizing $$T(\alpha) = AVGPerformance_{q_i:i=1,\ldots,k}(q_i) - \alpha \cdot AVGRisk_{q_i:i=1,\ldots,k}(q_i), \qquad (2)$$

Other formulations for optimizing $T(\alpha)$ are contemplated and are intended to fall under the scope of the hereto-appended claims. Another exemplary algorithm that can be employed by the learner component 110 to optimize the ranker component 106 is as follows:

$$-T(\alpha) = -AVGReward_{q_i:i=1,\ldots,k}(q_i) + \alpha \cdot AVGRisk_{q_i:i=1,\ldots,k}(q_i)$$

where Performance $(q_i)$ is based upon the performance scores for the ranker component 106 for all queries in the training data 104, regardless of whether the ranker component 106 performs poorly or not.

In another exemplary embodiment, it may be desirable to improve robustness of the ranker component 106 relative to a pre-existing ranker component. For example, it may be desirable to improve robustness of the ranker component 106 relative to a previously released ranker component (in a search engine). In another exemplary embodiment, it may be desirable to improve robustness of the ranker component 106 relative to a ranker component of a competitor. Accordingly, the system 100 may include a baseline ranker component 112, wherein robustness of the ranker component 106 is desirably improved relative to the performance of the baseline ranker component 112.

The baseline ranker component 112 can output search results for queries in the training data 104, and the performance computer component 108 can compute performance values (per query) for the baseline ranker component 110. While the baseline ranker component 112 is shown as receiving the training data 104 from the data store 102, it is to be understood that the baseline ranker component 112 can receive training data from some other data store. Therefore, for each query in the training data 104, the performance computer component 108 can output performance scores for both the baseline ranker component 112 and the ranker component 106. Such scores can be compared, on a per query basis, to ascertain how the ranker component 106 performs relative to the baseline ranker component 112. Typically, the ranker component 106 will perform better on a first subset of the queries when compared to the baseline ranker component 112, and the baseline ranker component 112 will perform better on a second subset of the queries when compared to the ranker component 106. Accordingly, a relative performance distribution can result. The learner component 110 can train the ranker component 106 such that the variance in the relative performance is reduced, wherein a tradeoff between risk and reward is considered (reward referring to improvement in performance scores for the first subset of queries and risk referring to declination in performance scores for the second subset of queries). Risk and reward of the ranker component 106, relative to the baseline ranker component 112, can be defined in any suitable manner. For instance, $M_B(q)$ can be the effectiveness of the baseline ranker component 112 for query q, and $M_H(q)$ can be the effectiveness of the ranker component 106 for the query q (as computed by the performance computer component 108). In an example, $Risk(q)=M_B(q)-M_H(q)$, if $M_B(q)>M_H(q)$; 0 otherwise, and $Reward(q)=M_H(q)-M_B(q)$, if $M_B(q)<M_H(q)$; 0 otherwise.

Other definitions are also contemplated. For example, to be considered as a reward for a certain query, a performance score of the ranker component 106 may desirably be some threshold number higher than the performance score of the baseline ranker component 112. Similarly, to be considered as a risk for a query, a performance score of the ranker component may desirably be some threshold number lower than the performance score of the baseline ranker component 112. In another embodiment, all declinations in performance by the ranker component 106 relative to the baseline ranker component 112 can be penalized equally. In still yet another exemplary embodiment, a risk value (or reward value) can depend solely upon a top threshold number of search results returned by the ranker component 106 and the baseline ranker component 112, such that mitigating risk over top positions in search results is important.

Similar to what has been described above, values for risk and reward can be a function of "importance" of certain queries, such that more frequently issued queries are assigned additional risk or reward weights when compared to less frequently issued queries. Given such definitions of risk and reward, algorithms (1) and (2) set forth above can be employed by the learner component 110 to train the ranker component 106. For algorithm (2), Performance(q) can be a performance score for the baseline ranker component 112 for query q output by the performance computer component 108, a performance score for the ranker component 106 for query q output by the performance computer component 108, or some combination thereof.

The system 100 can be employed such that the learner component 110 trains a plurality of different ranker components with different values of α. For instance, rankers optimized using different values for a can perform quite differently. Pursuant to an example, a ranker component that is trained that is learned to be very risk aware (high value of α) may give more emphasis to features that give meta-information about confidence or quantity of data used to estimate other features. Accordingly, by varying the values assigned to α, a range of ranker components with complementary properties can be obtained. Ranker components may then be combined generically for all queries to obtain a robust ranker with high overall performance. In another embodiment, rankers can be combined in a query specific manner to obtain high-quality, stable search results. Moreover, comparison of performance scores corresponding to different rankers that have differing risk-sensitivities can be analyzed to identify stable or noisy individual ranking features that are employed by the ranker components to output a ranked list of search results. Accordingly, it is to be understood that features described herein can be utilized in offline settings, such as when learned models are not directly applied to produce rankings online, but are instead utilized to ascertain which features to analyze when ranking, noise detection, and the like.

It is also to be understood that the weight referenced above can be altered on a per query basis, a per search session basis, or the like, thereby allowing the ranker component 106 to be more or less risk averse depending upon a situation. For example, if a ranker component 106 is known to perform relatively poorly for a particular query, then a value for the weight can be automatically assigned to cause the ranker component 106 to be less risk averse (thereby possibly increasing reward). In other examples, a user may be more or less risk averse, and the weight can be assigned to the ranker component 106 based upon known or inferred risk-averseness of the user.

Figure 2:
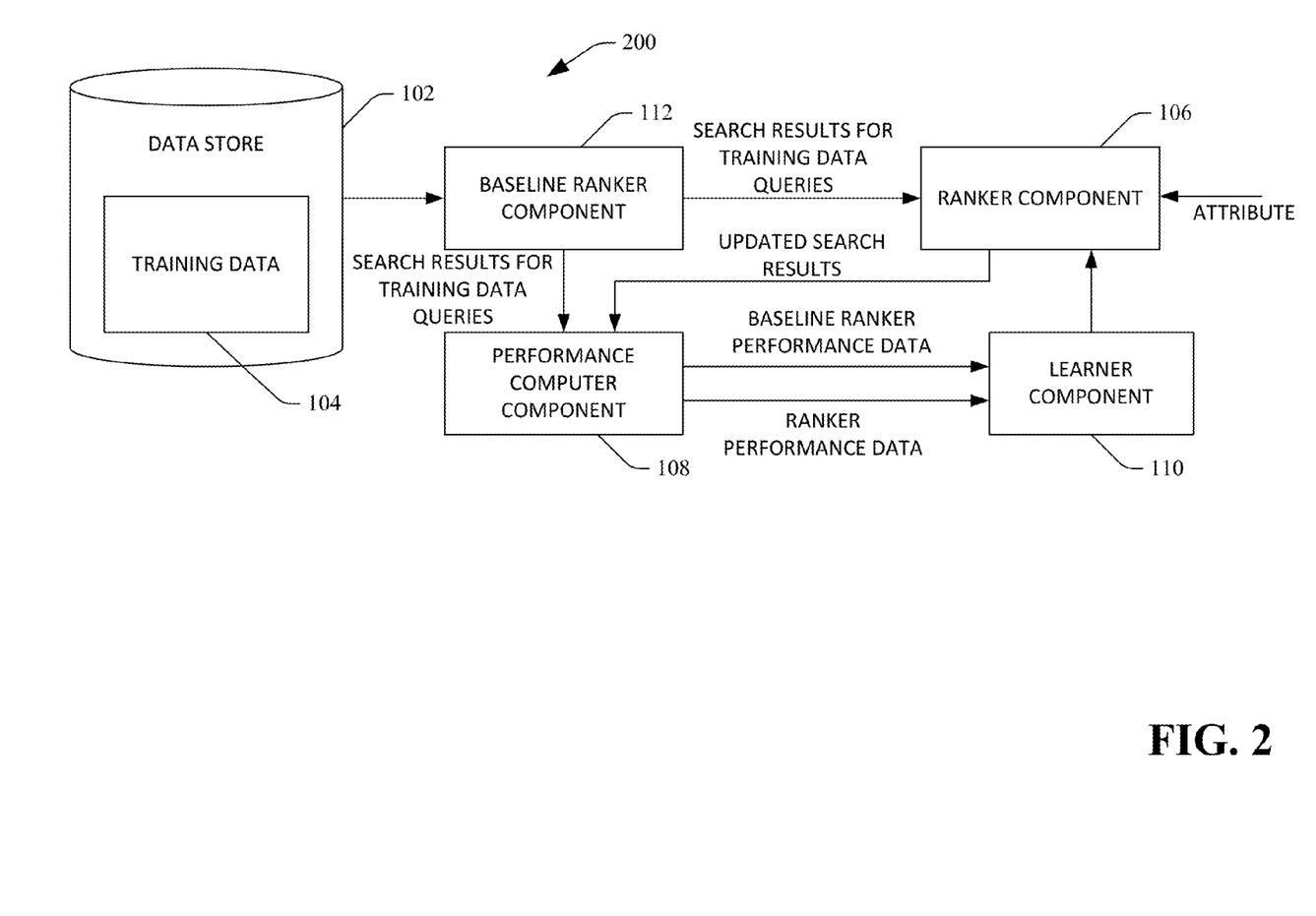
FIG. 2 is a functional block diagram of an exemplary system that facilitates learning parameters of a re-ranker by optimizing the re-ranker for a risk-based objective.

With reference now to FIG. 2, an exemplary system 200 that facilitates training a re-ranker to optimize a risk-oriented objective is illustrated. The system 200 comprises the data store 102 that includes the training data 104. The baseline ranker component 112 output search results for queries in the training data 104, and the performance computer component 108 computes, for each query in the training data 104, performance scores for the baseline ranker component 112.

The system 200 further comprises the ranker component 106, which receives the search results from the baseline ranker component 112 and re-ranks the search results based upon a value of an attribute. Such attribute may be a user specific attribute, such as user location, gender, age, or the like. Accordingly, the ranker component 106 can be a personalization ranker that re-ranks search results output by the baseline ranker component 112 based upon a user-specific attribute. In other embodiments, the baseline ranker component 112 can be a personalization ranker that initially ranks search results. The performance computer component 108 receives the updated search results output by the ranker component 106 and computes, for each query in the training data 104, a respective performance score for the ranker component 106.

The learner component 110 then sets a value for at least one parameter of the ranker component 106 to optimize the ranker component 106 for a risk-oriented objective. The updating of the parameter of the ranker component 106 to cause the ranker component 106 to be optimized for the risk-oriented objective has been described above. The system 200 is presented herein to illustrate that the ranker component 106 can be combined with the baseline ranker component 112 to output search results. For instance, the ranker component 106 can be linearly combined with the baseline ranker component 112 such that the baseline ranker component 112 can assign first scores to search results responsive to receipt of a query, and the ranker component 106 can assign second scores to search results responsive to receipt of the query, and the order of the search results is based upon a combination of the first scores and the second scores. The learning process can be undertaken several times for several different ranker components, such that a ranker utilized in a search engine may be a combination of several rankers that have varying averseness to risk.

Figure 3:
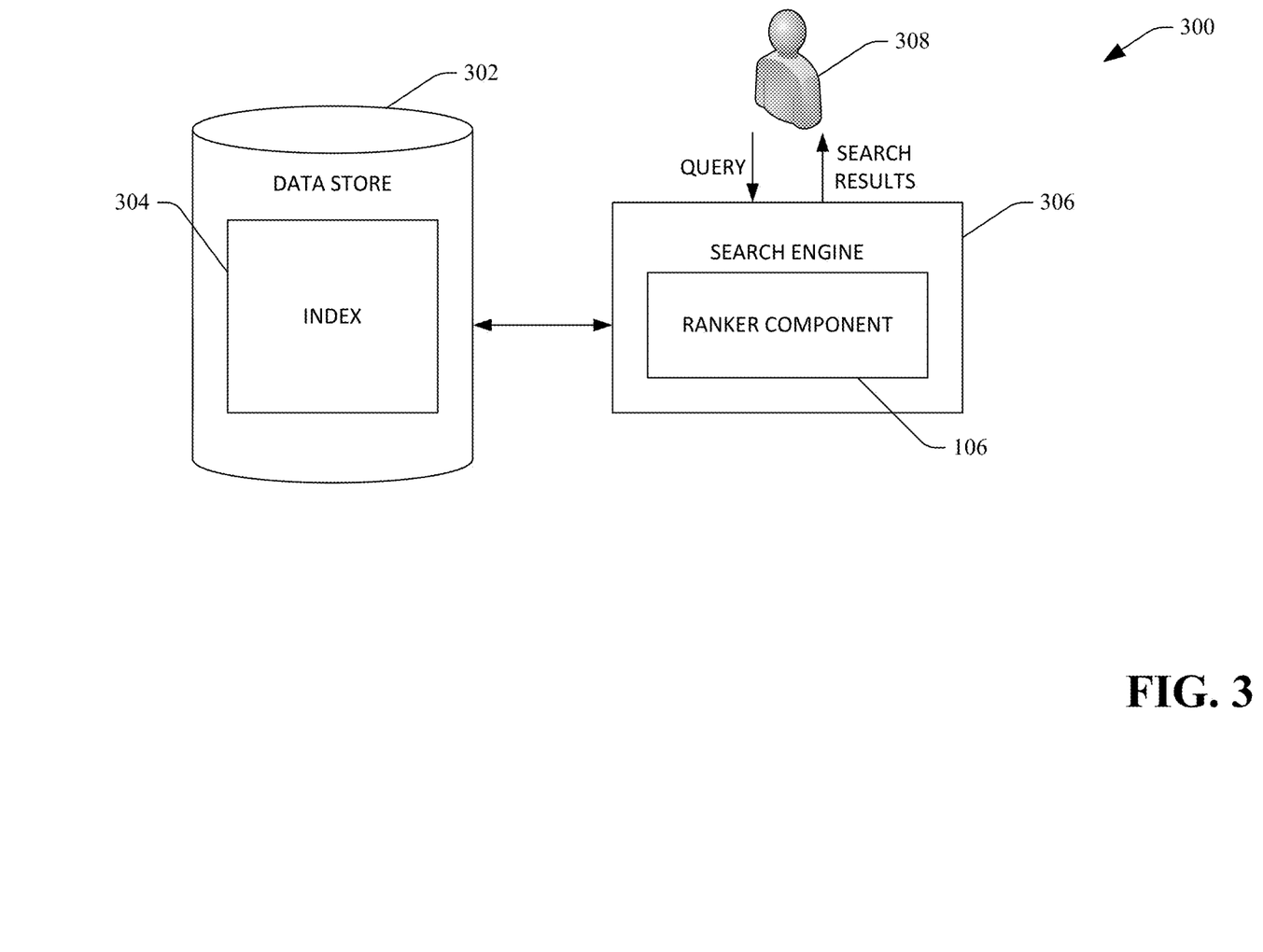
FIG. 3 is a functional block diagram of an exemplary system that facilitates retrieving search results through utilization of a ranker that is trained by optimizing the ranker for a risk based objective.

Now turning to FIG. 3, an exemplary system 300 that facilitates providing search results to a user responsive to receipt of a query is illustrated. The system 300 comprises a data store 302 that includes a search engine index 304. A search engine 306, which may be a web-accessible search engine, can receive a query from a user 308. The search engine 306 comprises the ranker component 106, which has been optimized for the risk-oriented objective. As described above, the search engine 306 can employ the ranker component 106 to output search results to the user 308 responsive to receipt of a query. Thus, the ranker component 106 can access the index 304 in the data store 302 responsive to receipt of the query from the user 308, and can thereafter output search results to the user 308 in a ranked list of search results.

Figure 4:
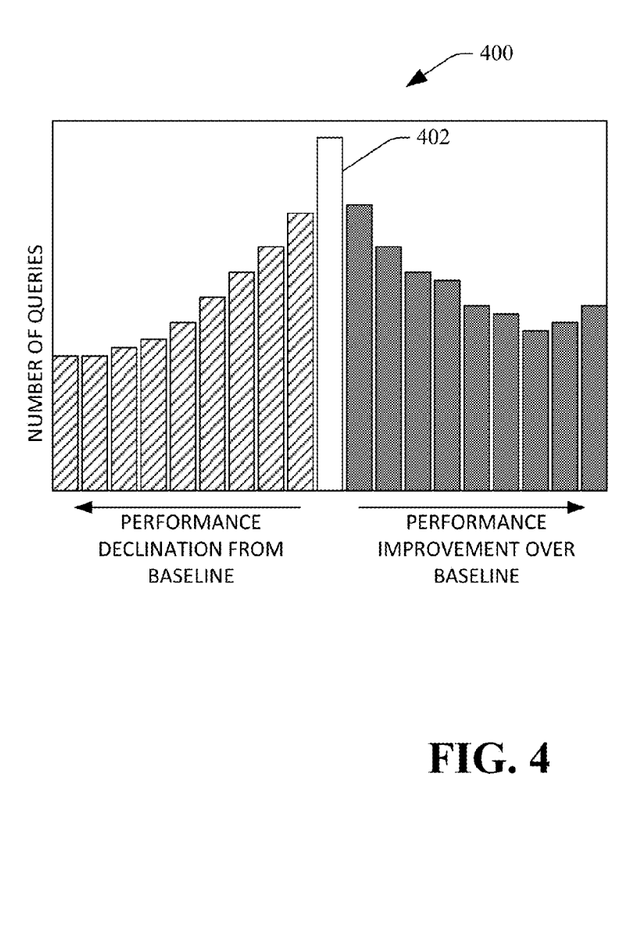
FIG. 4 is an exemplary bar chart that illustrates performance of a ranker relative to a baseline ranker for a plurality of queries.

With reference now to FIG. 4, an exemplary bar chart 400 that illustrates a distribution in performance of a ranker component relative to a baseline ranker component is illustrated. The bars in the bar chart represent a number of queries, and a position from the center bar 402 represents a quantized difference in performance for queries between the ranker component and the baseline ranker component. In the exemplary bar chart 400, the ranker component has been optimized for a performance metric, which can result in a relative large performance distribution for the ranker component relative to the baseline ranker component.

Figure 5:
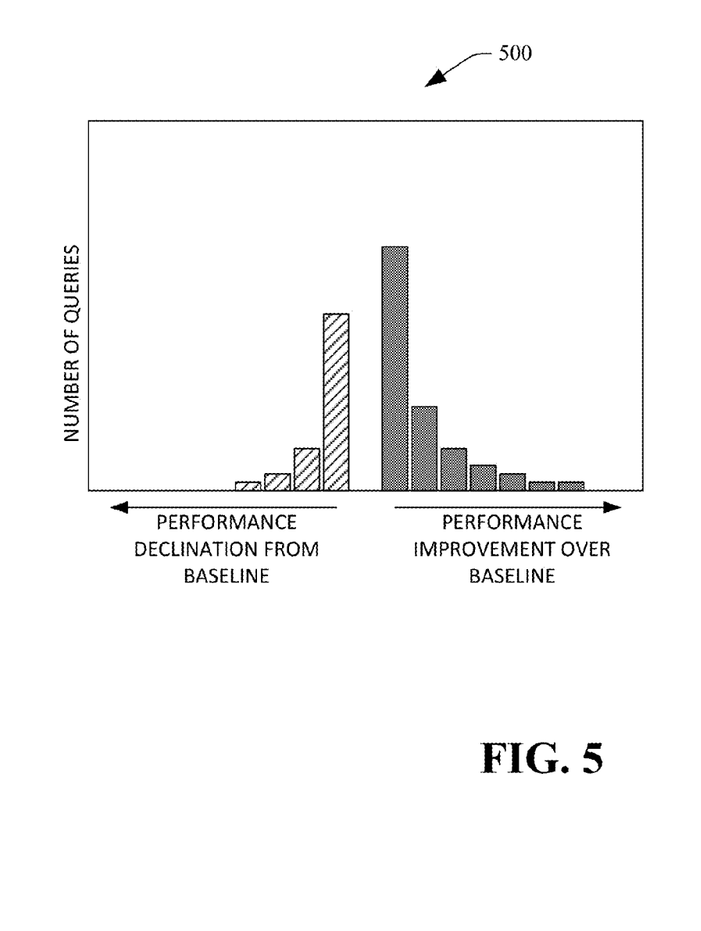
FIG. 5 is an exemplary bar chart that illustrates performance of a ranker relative to a baseline ranker when the ranker is optimized for a risk-based objective.

Turning now to FIG. 5, an exemplary bar chart 500 that illustrates a distribution in performance of the ranker component relative to the baseline ranker component when the ranker component has been optimized for a risk-oriented objective is shown. It can be noted that the performance of the ranker component, when averaged over all queries, may be lower when the ranker component is optimized for the risk-oriented objective. As can be ascertained from reviewing the bar chart 500, however, the distribution in performance of the ranker component (particularly where the ranker component does not perform as well as the baseline ranker component) is reduced.

Figure 6:
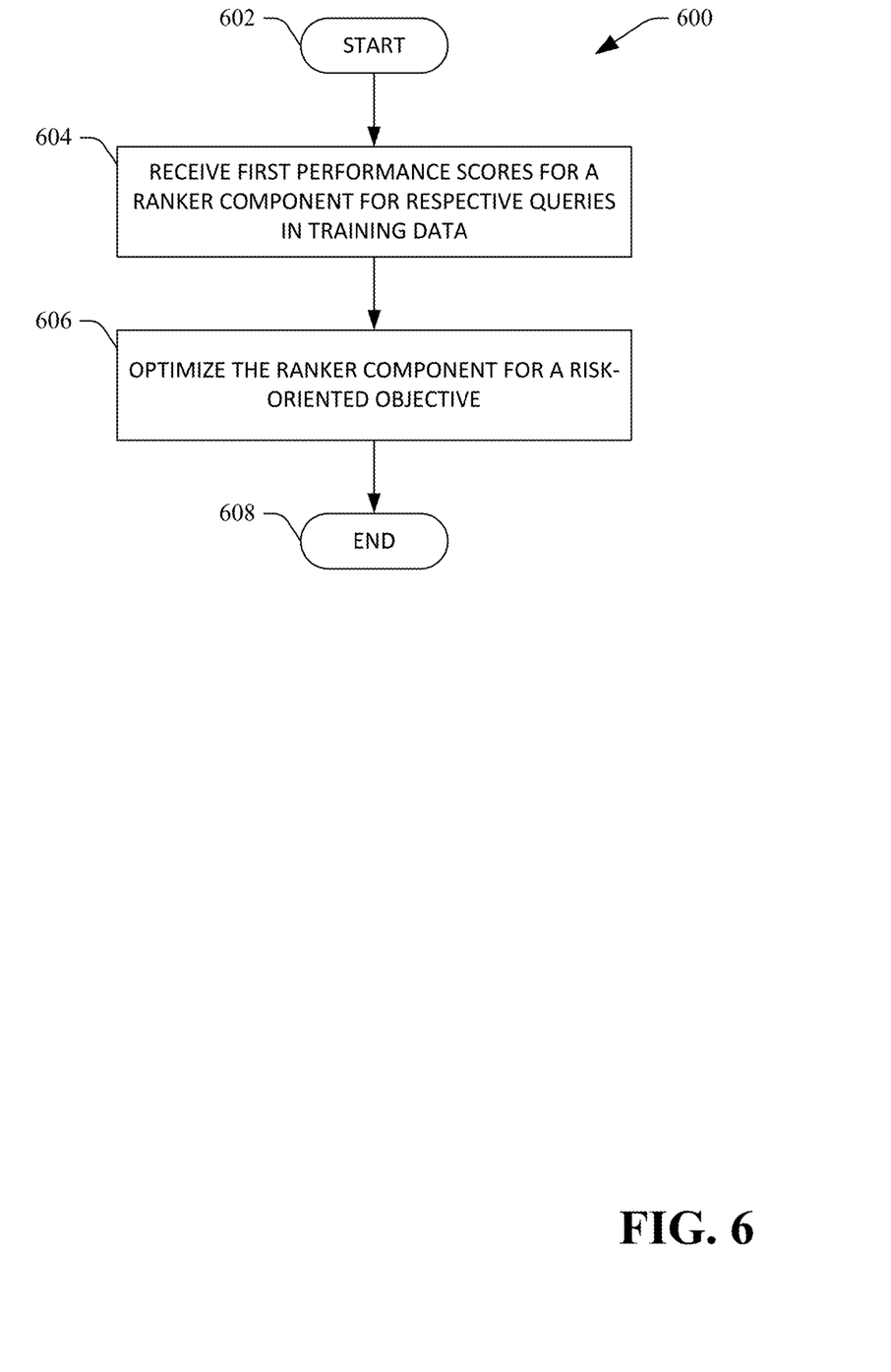
FIG. 6 is a flow diagram that illustrates an exemplary methodology for learning parameters of a ranker by optimizing the ranker for a risk-oriented objective.
Figure 7:
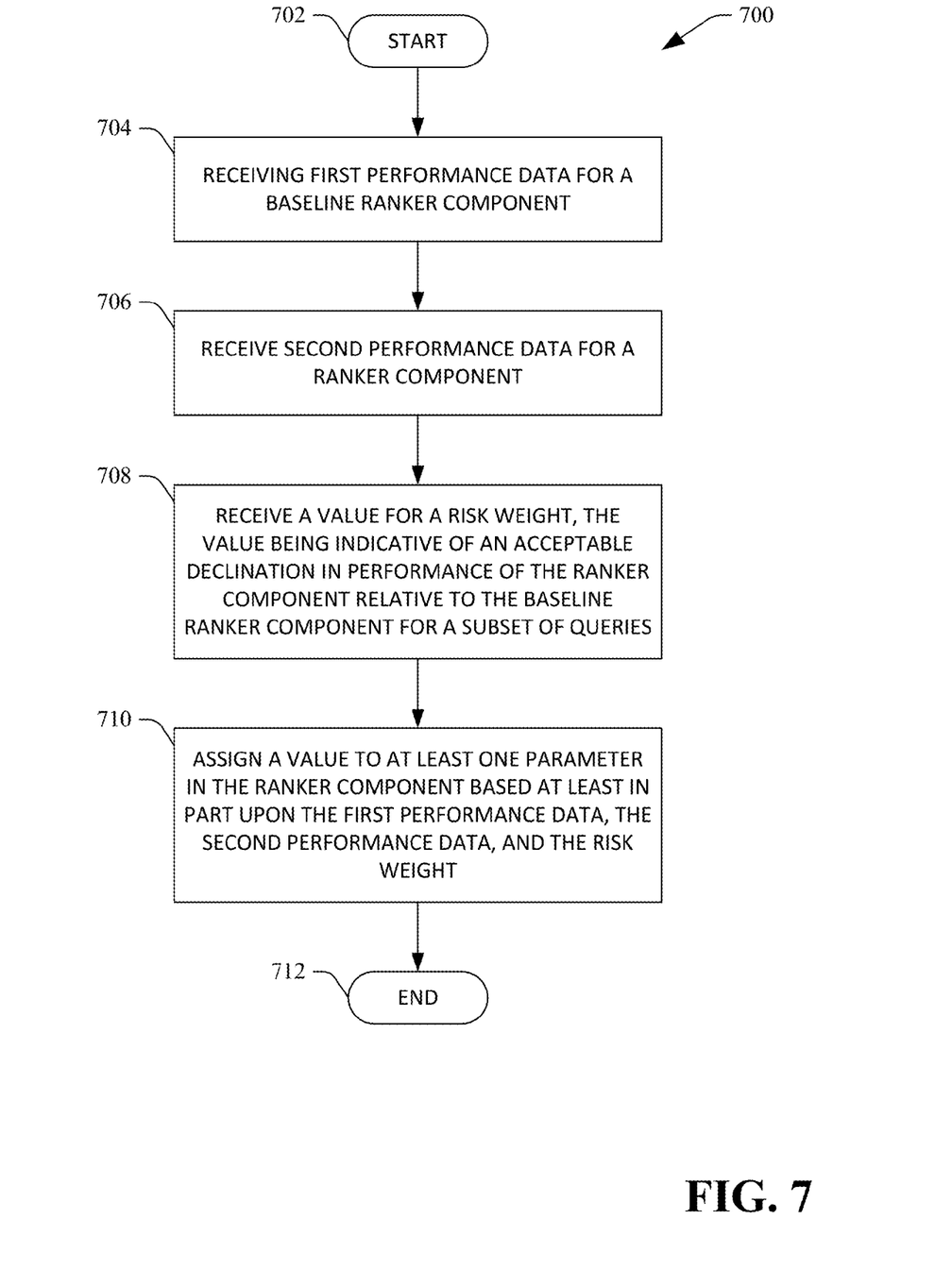
FIG. 7 is a flow diagram that illustrates an exemplary methodology for learning parameters of a ranker by optimizing the ranker for a risk-oriented objective.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 6, an exemplary methodology 600 that facilitates optimizing a ranker component for a risk-oriented objective is illustrated. The methodology 600 starts at 602, and at 604 first performance scores for a ranker component are received, wherein the first performance scores are indicative of performance of the ranker component for respective queries in training data. As discussed above, the training data comprises the queries and labeled search results, such that the desired order of search results for the queries are known.

At 606, the ranker component is optimized for a risk-oriented objective, the risk-oriented objective being a function of a variance of the performance scores for the ranker component. For instance, it may be desirable to optimize the ranker component to reduce performance scores for queries that are very low, possibly at a cost of reducing an average performance of the ranker component across all queries. The methodology 600 completes at 608.

With reference now to FIG. 7, an exemplary methodology 700 that facilitates training a ranker component for a risk-oriented objective and relative to a baseline ranker component is illustrated. The methodology 700 starts at 702, and at 704 first performance data for a baseline ranker component is received. The first performance data can indicate performance of the baseline ranker component for each query in training data in accordance with some standard metric. At 706, second performance data for a ranker component is received. The second performance data for the ranker component indicates performance of the ranker component for each query in training: data in accordance with the standard metric.

The 708, a value for risk weight is received, wherein the value for the risk weight is indicative of an acceptable declination in performance of the ranker component relative to the baseline ranker component for a subset of queries in the queries in the training data. For example, risk-oriented objective can include a risk term, and the risk weight can be assigned to the risk term. Further, the risk term can accord to any suitable definition of risk. For instance, the risk term can be based upon differences in performance scores for the baseline ranker component and the ranker component for queries upon which the baseline ranker component outperforms the ranker component. In another exemplary embodiment, the risk term can be based upon some threshold percentage of performance scores where the baseline ranker component outperforms the ranker component, such that all instances of the baseline ranker component outperforming the ranker component are penalized equally. Still further, the risk term can take into consideration performance of the baseline ranker component and the ranker component with respect to top positions in search results, such that top positions are given greater importance.

At 710, a value is assigned to at least one parameter of the ranker component based at least in part upon the first performance data, the second performance data, and the risk weight. For example, the first performance data and the second performance data can be analyzed to determine a reward of utilizing the ranker component with or versus the baseline ranker component. The first performance data and the second performance data can be further analyzed to determine a risk of utilizing the ranker component with or versus the baseline ranker component. The methodology 700 completes at 712.

Figure 8:
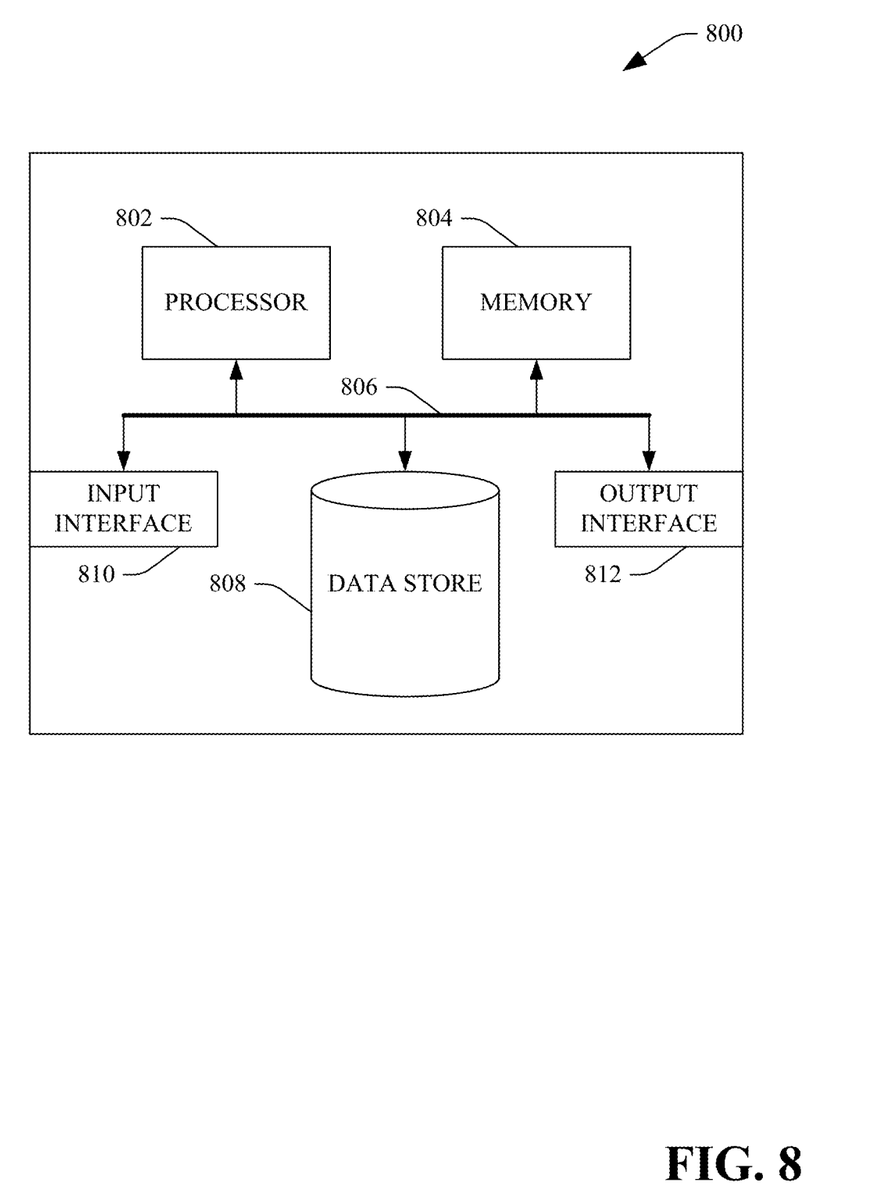
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports optimizing a ranker for a risk-oriented objective. In another example, at least a portion of the computing device 800 may be used in a system that supports combining rankers that have varying degrees of risk averseness. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store training data, a risk weight, performance scores, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, performance data for a ranker component or baseline ranker component, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   at a ranker component, outputting search results for queries in training data, the ranker component outputs the search results based upon a value of a parameter of the ranker component;
   determining performance scores for the ranker component with respect to the queries and the search results output based upon the queries, the performance scores are indicative of performance of the ranker component when outputting the search results based upon the queries, the performance scores include a performance score for each query in the queries; and
   optimizing the ranker component with respect to a risk-oriented objective, the risk-oriented objective being a function of consistency in performance of the ranker component with respect to the queries, wherein optimizing the ranker component with respect to the risk-oriented objective causes the ranker component to perform consistently across queries provided to the ranker component, and further wherein optimizing the ranker component comprises:
      identifying a second value of the parameter of the ranker component such that, when the ranker component outputs second search results for the queries based upon the second value of the parameter, consistency in second performance scores is increased compared to consistency in the first performance scores, the second performance scores being for the ranker component with respect to the queries and the second search results output based upon the queries, the second performance scores are indicative of performance of the ranker component when outputting the second search results for the queries; and
      assigning the second value of the parameter to the ranker component, wherein the ranker component, when assigned the second value of the parameter, fails to be optimized with respect to an average of performance scores for the queries achievable by way of the ranker component, wherein optimizing the ranker component is performed by a computer processor.

2. The method of claim 1, wherein the risk-oriented objective comprises a risk term, the risk term being based upon a subset of performance scores in the performance scores for a subset of queries in the queries, the subset of performance scores for the subset of queries indicate that the ranker component performs poorly when ranking documents based upon the subset of queries, each performance score in the subset of performance scores being beneath a threshold value.

3. The method of claim 1, wherein the risk-oriented objective comprises a risk term, the risk term being based upon a subset of performance scores in the performance scores for a subset of queries in the queries, the subset of performance scores indicate that the ranker component performs poorly when ranking documents based upon the subset of queries, each performance score in the subset of performance scores being in a threshold percentage of lowest performance scores from amongst the performance scores.

4. The method of claim 1, wherein the risk-oriented objective comprises a risk term, and further comprising:
   assigning a weight to the risk term, wherein the weight corresponds to an amount of acceptable variance in the second performance scores.

5. The method of claim 1, wherein the risk-oriented objective comprises a reward term, the reward term being based upon a subset of performance scores in the performance scores for a subset of queries in the queries, the subset of performance scores indicate that the ranker component performs well when ranking documents based upon the query, each performance score in the subset of performance scores being above a threshold value.

6. The method of claim 1, wherein the risk-oriented objective comprises a reward term, the reward term being based upon a subset of performance scores in the performance scores for a subset of queries in the queries, the subset of performance scores indicate that the ranker component performs well when ranking documents based upon the query, each performance score in the subset of performance scores being in a threshold percentage of highest performance scores from amongst the performance scores.

7. The method of claim 1, further comprising:
   receiving third performance scores for a baseline ranker component, the third performance scores are indicative of performance of the baseline ranker component when ranking documents based upon the queries in the training data, wherein the risk-oriented objective is based upon the performance scores relative to the third performance scores.

8. The method of claim 7, wherein the updated ranker component is a re-ranker that is configured to re-rank search results output from the baseline ranker component responsive to receipt of a query.

9. The method of claim 8, wherein the updated ranker component is a personalized ranker that re-ranks the search results based at least in part upon a user attribute.

10. The method of claim 7, wherein the risk-oriented objective comprises a risk term, the risk term being based upon respective differences between a first subset of performance scores in the performance scores and a second subset of performance scores in the third performance scores for a subset of queries in the queries, where the baseline ranker component outperforms the ranker component when ranking documents based upon queries in the subset of the queries.

11. The method of claim 10, wherein the risk-oriented objective comprises a reward term, the reward term being based upon respective differences between a third subset of performance scores in the performance scores and a fourth subset of performance scores in the third performance scores for a second subset of queries, where the ranker component outperforms the baseline ranker component when ranking documents based upon queries in the second subset of queries.

12. The method of claim 1, further comprising:
repeating the act of optimizing for a plurality of ranker components, wherein the optimizing is undertaken to cause the plurality of ranker components to have varying risk-averseness; and
combining the plurality of ranker components in a search engine.

13. A system, comprising:
at least one processor; and
memory that comprises instructions that, when executed by the at least one processor, cause the at least one processor to perform acts comprising:
 computing first performance scores for a ranker, the first performance scores indicative of performance of the ranker when the ranker returns ranked lists of search results based upon queries from training data, the ranker returns the ranked lists of search results based upon a parameter of the ranker having a first value, the first performance scores having a variance; and
 optimizing the ranker for a risk-oriented objective to increase consistency of performance of the ranker across queries, the risk-oriented objective being a function of consistency in performance of the ranker with respect to the queries from the training data, wherein optimizing the ranker for the risk-oriented objective comprises:
  identifying a second value for the parameter, wherein when the ranker, when having the second value for the parameter, outputs second ranked lists of search results based upon the queries from the training data, the second ranked lists of search results have second performance scores corresponding thereto that are indicative of performance of the ranker for the queries when outputting the second ranked lists of search results, second performance scores have a second variance, the second value identified based upon in the second variance being less than the first variance; and
  assigning the second value to the parameter of the ranker, wherein assigning the second value to the parameter causes the consistency of performance of the ranker to increase compared to when the second value is assigned to the parameter.

14. The system of claim 13, wherein optimizing the ranker for the risk-oriented objective comprises optimizing the ranker based upon third performance scores for a baseline ranker component, the third performance scores being for the queries from the training data, the third performance scores indicate that the baseline ranker component performs poorly when ranking documents based upon the queries.

15. The system of claim 14, wherein the risk-oriented objective is based upon respective differences between the first performance scores and the third performance scores.

16. The system of claim 15, wherein the risk-oriented objective comprises a risk term, the risk term based upon the first performance scores relative to fourth performance scores for queries in the training data upon which the baseline ranker component outperforms the ranker component.

17. The system of claim 16, wherein the risk-oriented objective comprises a reward term, the reward term based upon fifth performance scores for second queries in the training data, the fifth performance scores indicate that the ranker component outperforms the baseline ranker component for the second queries, the ranker component optimized based upon the risk term and the reward term.

18. The system of claim 16, wherein the risk-oriented objective comprises an average term that is indicative of average performance of the baseline ranker component across the queries and the second queries, the ranker component is optimized based upon a difference between the risk term and the average term.

19. The system of claim 16, wherein the risk term is weighted by a user-definable weight.

20. A computer-readable memory comprising instructions that, when executed by a processor, cause the processor to perform acts comprising:
at a ranker that is assigned a first value for a parameter of the ranker, outputting search results for queries in training data;
determining performance scores for the ranker with respect to the queries and the search results, the performance scores include a first respective performance score for each query;
optimizing the ranker with respect to a risk-oriented objective, wherein the risk-oriented objective is configured to consider consistency in performance of the ranker with respect to the queries, wherein optimizing the ranker with respect to the risk-oriented objective comprises:
 identifying a second value for the parameter such that, when the ranker is assigned the second value for the parameter, the ranker outputs second search results for the queries in the training data;
 determining second performance scores for the ranker with respect to the queries and the search results, the second performance scores include a second respective performance score for each query;
 determining, based upon the first performance scores and the second performance scores, that consistency of performance of the ranker is greater when the ranker is assigned the second value for the parameter compared to the consistency of performance of the ranker when the ranker is assigned the first value for the parameter; and
 assigning the second value for the parameter to the ranker to cause the ranker to perform more consistently.

* * * * *